2,868,689

PHARMACEUTICAL PREPARATIONS CONTAINING DYCLONINE HYDROCHLORIDE AND CHLOROBUTANOL

Herbert J. Florestano, Sampson F. Jeffries, Clyde E. Osborne, and Max E. Bahler, Indianapolis, Ind., assignors to Allied Laboratories, Inc., Kansas City, Mo., a corporation of Delaware No Drawing. Application October 9, 1956
Serial No. 614,813

4 Claims. (Cl. 167—52)

This invention relates to aqueous-containing pharmaceutical preparations including dyclonine hydrochloride (4-n-butoxy-$\beta$-piperidinopropiophenone hydrochloride) and chlorobutanol. More particularly, this invention is concerned with aqueous mediums containing dyclonine hydrochloride stabilized by chlorobutanol and possessing topical anesthetic effects. Still more particularly, this invention relates to aqueous-containing pharmaceutical preparations comprising dyclonine hydrochloride stabilized with chlorobutanol and wherein said preparations possess antimicrobial action that is greater than that possessed by dyclonine hydrochloride or chlorobutanol when used alone.

Dyclonine hydrochloride is a white crystalline powder possessing topical anesthetic properties characterized by rapid onset of effect, lack of systemic toxicity and a low index of sensitization. These desirable topical anesthetic effects of dyclonine hydrochloride are described in the following publications: Shelmire et al., Evaluation of A New Topical Anesthetic, Dyclonine Hydrochloride, A. M. A. Archives of Dermatology, June 1955, vol. 71, pp. 728–730; Morginson et al., Dyclonine Hydrochloride: A New Topical Antipruritic Agent, Postgraduate Medicine, June 1956, vol. 19, No. 6, pp. 605–607; Harry E. Fisher, M. D., Dyclonine Hydrochloride: Evaluation of A New Topical Anesthetic In Minor Urologic Technics, Missouri Medicine, December 1955, pp. 943–944; R. O. Noojin, The Dermatologic Management of Pruritus, Southern Medical Journal, 49:149 (February) 1956.

Dyclonine hydrochloride also possesses significant antimicrobial action.

When dyclonine hydrochloride is employed in non-aqueous-containing pharmaceutical preparations for topical application, there does not appear to be any lack of stability of the dyclonine hydrochloride. On the other hand, however, when aqueous-containing pharmaceutical preparations were employed in conjunction with dyclonine hydrochloride for use as a topical anesthetic, it was found that the dyclonine hydrochloride lacked stability. This lack of stability was evidenced in a relatively short time and was readily apparent by the development of cloudiness. In an attempt to stabilize dyclonine hydrochloride in these aqueous preparations a large number of recognized pharmaceutical stabilizers were tested and found to be unsatisfactory. Among the stabilizers that were found to be unsatisfactory are: phenol, benzyl alcohol, sodium bisulfite, boric acid, methyl parahydroxybenzoate, merthiolate, benzalkonium chloride (Zephiran chloride), and di-isobutyl-phenoxyethoxyethyldimethylbenzylammonium chloride. We discovered, however, that chlorobutanol not only served as a satisfactory stabilizer for dyclonine hydrochloride in aqueous mediums but also resulted in producing a synergistic antimicrobial effect.

In the case of many aqueous-containing pharmaceutical preparations containing topical anesthetics, instability is frequently due to microbial growth. In the case of dyclonine hydrochloride, this does not appear to be the case since dyclonine hydrochloride itself possesses significant antimicrobial action, and since the various stabilizers which were found to be unsatisfactory also possess antimicrobial action.

We do not desire to limit ourselves to any specific theory as to the cause of the deterioration of dyclonine hydrochloride which occurs in aqueous mediums, as evidenced by the appearance of cloudiness. The deterioration appears to be due to a spontaneous breakdown, and the rate of breakdown is somewhat dependent on the pH and the temperature. It seems that the rate of breakdown increases as the temperature increases while at a constant temperature the rate of breakdown decreases with a decrease in pH. At a given temperature stabilization may be achieved by the addition of sufficient hydrochloric acid or buffered components to hold the pH in a stable range. This method of stabilizing dyclonine hydrochloride in aqueous-containing pharmaceutical preparations is not satisfactory from a pharmaceutical standpoint and cannot be satisfactorily employed because of the excessive amount of acid or buffer required. Our discovery that chlorobutanol in solution provides a satisfactory stabilization of dyclonine hydrochloride in aqueous mediums may be due to the slow liberation of hydrochloric acid through hydrolysis at a rate which increases with temperature. We do not desire to limit ourselves to this theory, however, since the synergistic antimicrobial action which is produced by the dyclonine hydrochloride and chlorobutanol may also contribute to the stability.

The following specific examples will illustrate the type of aqueous-containing pharmaceutical preparations wherein dyclonine hydrochloride and chlorobutanol are used in combination to result in stabilized preparations:

EXAMPLE I

*Dyclonine hydrochloride and chlorobutanol products*

Solution dyclonine hydrochloride
0.5% _____ 60 gal.
   Water for injection _____ 54 gal.
   0.3% chlorobutanol hydrous____ 1 lb. 9 oz. 93 gr.
    Stir to dissolve—add
   Hydrochloric acid N/10 _____ 116 cc.
   0.5% dyclonine hydrochloride__ 2 lb. 1 oz. 26 gr.
    Stir to dissolve—add
   0.9% equiv. sodium chloride____ 3 lb. 14 oz. 422 gr.
   Water for injection p. s _____ 60 gal.
   Add
   Hydrochloric acid N/10 to pH__ 3.9–4.1.

EXAMPLE II

*Solution dyclonine hydrochloride with neomycin*

Procedure and amount of each material is the same as for sol. dyclonine hydrochloride 0.5%, except, before adding water for injection to make up volume, neomycin sulfate is added in sufficient amount to make the equivalent of 1 mg. of neomycin base per cc. of finished product.

EXAMPLE III

*Dyclonine hydrochloride creme 1%*

| | |
|---|---|
| White wax | 16 lb. |
| Polyethylene glycol 1000 monostearate | 64 lb. |
| Polyethylene glycol 400 monostearate | 40 lb. |
| Stearic acid | 144 lb. |

Heat to 80° C. in steam kettle
Add with stirring

| | |
|---|---|
| Dist. water | 550 lb. |

Stir until cooled to 45° C.
Add

| | |
|---|---|
| Chlorobutanol anhydrous | 2 lb. 13 oz. 151 gr. |

Stir until dissolved
Add

| | |
|---|---|
| Hydrochloric acid | 11 fl. oz. 364 min. |
| Dist. water | 7 pt. |

Stir—Add

| | |
|---|---|
| Dist. water q. s. | 800 lb. |

Use the base as needed to make

| | |
|---|---|
| 1% dyclonine hydrochloride | 9 lb. 9 oz. 262 gr. |
| Base above to make | 800 lb. |

Mix—mill

In the foregoing examples the concentration of dyclonine hydrochloride and chlorobutanol can be varied to a considerable extent and satisfactory results still be obtained. In general, we prefer to employ dyclonine hydrochloride in concentrations ranging from about 0.1% to about 5%, and chlorobutanol in concentrations ranging from about 0.1% to about 0.5%.

The synergistic antimicrobial action between decylonine and chlorobutanol has been demonstrated in the following type experiment. The first type experiment entailed the comparison of minimal lethal concentrations of each agent separately and in combination by the tube dilution procedure. When this method was employed using *Staphylococcus aureus* it was found that lethal action was produced with only one-fourth the minimum bactericidal concentration of chlorobutanol in combination with one-half the minimum bactericidal concentration of dyclonine hydrochloride. Similar evidence of synergism between the two drugs was observed with *Proteus vulgaris, Pseudomonas aeruginosa,* and *Canadida albicans.* In a second method for testing synergism, the rate of killing various microorganisms was tested. With this procedure it was shown that synergism existed since the two substances when acting in combination, each in a certain concentration for a certain time and under certain conditions on a fixed number of microorganisms, decreased the number to a lower level than did either of the agents acting alone at the concentration in which it was present in the combination and under the same conditions. For example, in these tests it was found that combinations of dyclonine hydrochloride and chlorobutanol were more highly effective in inhibiting multiplication of *Staphylococcus aureus* than were the same concentrations, respectively, of either agent alone. Synergism by this method was also shown with *Escherichia coli.*

The stabilizing effect of chlorobutanol and dyclonine hydrochloride in aqueous pharmaceutical preparations is illustrated by the following specific tests. In the first test the relationship of pH to stability is presented by consideration of the rate of appearance of cloudiness in solution buffered at different pH's. The results of these tests are shown in Table I.

TABLE I

[Dyclonine 1%, phosphate buffer M/15, temp. 45° C.]

| Preparation Number | Initial pH | After 3 days | | After 14 days | | After 3 to 4 wks. | |
|---|---|---|---|---|---|---|---|
| | | pH | appearance | pH | appearance | pH | appearance |
| 1 | 4.03 | 4.09 | clear | 4.17 | faint haze | 4.20 | Cloudy. |
| 2 | 4.98 | 5.01 | very slightly cloudy. | 5.01 | cloudy | | |
| 3 | 5.99 | 5.98 | cloudy | | | | |

As can be seen from Table I cloudiness appears in aqueous solutions of dyclonine hydrochloride following very slight changes in pH values.

In a second test the stability of dyclonine hydrochloride in an aqueous solution, which also contains chlorobutanol, is compared with that of a similar solution having, in addition, a phosphate buffer present. The data are shown in Table II.

TABLE II

[Dyclonine and chlorobutanol with and without buffer.]

| Solution Number | Dyclonine Hydrochloride, percent | Chlorobutanol, percent | Phosphate Buffer, M | Initial Values | | At 45° C. for 3 months | |
|---|---|---|---|---|---|---|---|
| | | | | Assay, percent | pH | Assay, percent | pH |
| #8473 | 0.5 | 0.3 | | 99.0 | 4.00 | 97.0 | 2.85 |
| #8477 | 0.5 | 0.5 | 0.01 | 99.7 | 4.65 | 94.8 | 2.90 |

A study of the results in Table II shows that the addition of a phosphate buffer to aqueous solutions of dyclonine hydrochloride containing chlorobutanol does not materially contribute to stabilization of the dyclonine hydrochloride.

In summary it is noted that dyclonine hydrochloride in aqueous solutions is stabilized by chlorobutanol. This stabilization by chlorobutanol is effective for prolonged periods of time. In summary also it is noted that aqueous solutions containing dyclonine hydrochloride and chlorobutanol possess an antimicrobial action that is greater than the action of either substance when used alone.

We claim:

1. A preparation having topical anesthetic and antimicrobial action comprising a relatively non-toxic and relatively non-sensitizing aqueous pharmaceutical carrier having incorporated therein from about .1% to 5% of dyclonine hydrochloride and from about .1% to .5% of chlorobutanol.

2. A pharmaceutical preparation comprising an aqueous solution containing about .5% of dyclonine hydrochloride and about .3% of chlorobutanol.

3. A pharmaceutical preparation comprising a water-miscible cream base containing about 1% dyclonine hydrochloride and about .5% of chlorobutanol.

4. A process of preparing a preparation possessing topical anesthetic and antimicrobial action which comprises incorporating in a relatively non-toxic and relatively non-sensitizing aqueous pharmaceutical carrier from about .1% to 5% of dyclonine hydrochloride and from about .1% to about .5% of chlorobutanol to give a stable dyclonine hydrochloride composition and provide a synergistic antimicrobial effect between the dyclonine hydrochloride and the chlorobutanol.

References Cited in the file of this patent

U. S. Dispensatory, 24th ed., 1947, Lippincott, Philadelphia, Pa., pp. 263–264.

Physicians' Desk Reference, 11th ed., 1956, Med. Econ. Inc., Rutherford, N. J., p. 536.